United States Patent
Sangwan et al.

(10) Patent No.: US 6,398,841 B1
(45) Date of Patent: Jun. 4, 2002

(54) ECOLOGICAL METHOD OF PHYTO-REMEDIATION OF ALKALINE AND CHEMICALLY DEGRADED SOILS USING SCENTED GERANIUM (PELARGONIUM SP.)

(75) Inventors: Rajender Singh Sangwan; Bali Ram Tyagi; Neelam Singh Sangwan, all of Lucknow (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 09/776,502

(22) Filed: Feb. 2, 2001

(51) Int. Cl.[7] .................................................. C05F 11/00
(52) U.S. Cl. ........................ 71/23; 405/128.1; 47/58.1
(58) Field of Search ............................. 71/23; 47/58.1; 405/128.1

(56) References Cited

U.S. PATENT DOCUMENTS 6,313,374 B1 * 11/2001 KrishnaRaj et al. ........ 800/278

FOREIGN PATENT DOCUMENTS

WO  9922885  * 5/1999

OTHER PUBLICATIONS

"Mapping of Salt Affected and Associated Degraded Soils of Indo–Gangetic Alluvial Plain of India for Sustainable Management"; Saxena, r>; Verma, D.; Sharma, R.; Srivastava, r.; Barthwal, A.; pp. 14–16.

"Reclamation of Chemically Degraded Soils"; Logan, T.; pp. 13–31; 1992.

* cited by examiner

Primary Examiner—Chhaya D. Sayala
(74) Attorney, Agent, or Firm—Merchant & Gould P.C.

(57) ABSTRACT

The present invention provides a novel ecological method of phyto-remediation of alkaline ad chemically degraded soils, said method comprising the steps of dispersing biomass obtained from Pelargonium sp. in alkaline or chemically degraded soil.

12 Claims, No Drawings

ECOLOGICAL METHOD OF PHYTO-REMEDIATION OF ALKALINE AND CHEMICALLY DEGRADED SOILS USING SCENTED GERANIUM (PELARGONIUM SP.)

FIELD OF THE INVENTION

The present invention relates to the ecological method of phyto-remediation of alkaline and chemically degraded soils using scented geranium (Pelargonium sp.).

BACKGROUND OF THE INVENTION

The world arable land resources are finited 78% of earth surface is unusable for agriculture and the 22% usable one includes only 3% of the earth surface as high productivity soils for intensive crop production whilst 6% and 13% are the values for the medium and low capacity soils, respectively. Thus, a substantial part of the agriculturally usable soil requires restoration and improvement on a continuous basis. Soil alkalinity (natural or agriculturally and industrially imparted) is one of the major causes of the poor productivity and chemical degradation of the soils on a global basis, Chemical methods of reclamation of the alkaline soils include application of soluble calcium salts like gypsum and phosphogypsum, use of sparingly soluble calcium salts like Calcite and amendments with acids or acid formers like $H_2SO_4$, iron and calcium sulfates, lime sulfur and pyrite etc.

However, the organic methods of soil reclamation are ecologically more acceptable and sustainable. There are several reports in the prior art on vegetation with specific plant species like rice (R. K. Gupta, R. R. Singh and I. P. Abrol, 1988, Soil Sci. 146:395), Prosopis juliflaura (R. K. Saxena, K. S. Veram, R. C. Sharma, R. Srivastava and A. K. Barthwal, 2000. International Conference on managing Natural Resource for sustainable Agriculture Production in the $21^{ST}$ Century, New Delhi February 14–18, 2000, Extended Summaries Vol. 2, pp. 14–16) for improvement of soil properties.. In general, some reduction in alkalinity due to organic residues is owing to growth of microbes on the available organic matter (and attendant liberation of carbon dioxide). This effect is secondary in nature and has no specificity of organic matter as anything from plant residues to sludge and sewage waste can function as substrate (T. J. Logan, 1992, Advances in Soil Sci. 17: 13–31 and references their in). Being, dependent on the microbial growth etc. its impact is obviously slight in magnitude and temporarily delayed. Thus, although there are several attempts in the prior art to reduce alkalinity in the soil, there is no report on the use of weeds or spent biomass for reclamation of alkaline soil.

It is the applicant's finding that the scented geranium biomass is useful in reclamation of alkaline soil by two mechanisms, first being direct (immediate) neuralization with very high acid content of the biomass (i.e as an accident), and second being usual (slight and delayed) biomass degradation associated phenomenon of pH neutralization.

This method provides an ecological alternative to the employment of chemical method of acid aided neutralisation of alkaline soil.

Further, scented geranium is a modern cash crop of robust growth cultivated for valuable exotic essential oil obtained from hydrodistillation of its aerial biomass, The essential oil possesses a delicate fragrance which is widely used in perfumery, cosmetic and flavour industries and aromatherapy (E. Gildemeister and Fr. Hoffmann, 1959, Die atherischen Ole. Vol. 5,p. 350, Akademie-Verlag, Berlin). The distillation-residual water as well as the distillation-residual biomass considered as wastes are strongly acidic in nature and can be employed to rejuvenate various sorts of alkaline soils. Thus, in addition to economic returns in the form of essential oil from harvestable biomass, the distillation-residual aerial biomass serves as an ideal material for employment in the reclamation of soils with alkalinity problem at farmers level (cottage practice) as well as at the commercial level of marketing. The approach besides being ecologically acceptable is a sustainable way of staling the patterns of development of alkalinity in the soils as a consequence of modern cropping and crop management practices and certain micro-environmental factors.

OBJECTS OF THE INVENTION

The main object of the present invention is to provide an ecological method of phyto-remediation of alkaline and chemically degraded soils using scented geranium (Pelargonium sp.).

Another object is to provide a novel method for reclamation of alkaline soil using biomass of scented geranium.

SUMMARY OF THE INVENTION

Accordingly, the invention provides a novel method for reclamation of alkaline and contaminated soil by the use of scented geranium biomass, which may be fresh or obtained after distillation process.

DETAILED DESCRIPTION OF THE INVENTION

The present invention provides a novel ecological method of phyto-remediation of alkaline and chemically degraded soils, said method comprising the steps of:

(a) dispersing fresh geranium biomass in alkaline or chemically degraded soil in ratio of 1:0.01 to 0.075, or (b) applying distillation residual water to the soil of step (a) in the ratio of 6:1–8:1, preferably 7.5:1.

In an embodiment, the scented geranium comprises plant of Pelargonium species.

In another embodiment fresh aerial biomass obtained after distillation of essential oil from the plant is used.

In still another embodiment, geranium biomass is mixed or dispersed with the alkaline or chemically degraded soil.

In yet another embodiment the pH of the alkaline soil is >8.5.

In another embodiment, the residual water obtained after distillation of essential oil from the biomass is percolated in the alkaline or chemically degraded soil.

In another embodiment, the treatment is continued for 4 weeks.

In an embodiment of the present invention fresh or distillation-residual aerial biomass of scented geranium (Pelargonium sp.) may be used for phyto-remediation of alkaline and contaminated soils.

In another embodiment of the present invention distillation-residual water of scented geranium may be used for the reclamation of alkaline soils.

The present invention provides an ecological method of phyto-remediation of alkaline and chemically degraded soils using scented geranium (Pelargonium species) which comprises treatment of the alkaline soil (pH>8.5) by dispersion or mixing of fresh aerial biomass or distillation-residual aerial biomass (obtained from essential oil distillation unit) or percolation of the distillation-residual water from scented geranium distillation unit. In case fresh Pelargonium aerial biomass is used, the soil to biomass ratio is in the range of 1:0.01 to 0.075 (w/w: soil:fresh aerial biomass). If dry distillation-residual aerial biomass is used, this treatment is followed by intermittent moistening of the mix for up to four weeks (or more). In case dry distillation residual aerial biomass is used, this biomass is mixed with the soil. The soil:biomass ratio being 1:03 to 0.06 w/w. If distillation-residual water from scented geranium distillation unit is used, then the ratio of soil: to distillation-residual water is 6:1 to 8:1, preferably 7.5:1. Such treatment of alkaline and chemically degraded soil with Pelargonium sp. resulted in the fall in pH of the alkaline soil.

The applicants have found that aerial plant parts of scented geranium are highly acidic in nature with cell sap pH of about 3.0 especially in parts like leaf lamina and floral parts (sepals and petals). Acidity of two volume aqueous extract of these fresh tissues was found to be more than S milliequivalents of sodium hydroxide. Since the aerial part of the plant yields acidic extract, these extracts are capable of bringing down the pH of alkaline or chemically degraded soil. It is for this reason that the applicant has used this plant in the phyto-remediation method for the soil alkalinity. pH of the distillation-residual water was found highly acidic (pH 3.5) when checked after distilling 200g of scented geranium aerial biomass in 200 ml of distilled water.

Thus, this invention provides an ecological approach of phyto-remediation of alkaline and contaminated soils through fresh and distillation-residual aerial biomass of scented geranium (Pelargonium sp.). The method of this invention can be adopted to rejuvenate the alkaline and chemically degraded soils including naturally alkaline soils, agricultural system associated alkalizing soils, mining rejected alkaline wastes (like Red Mud produced from bauxite) imparted alkaline soils, mine reject soils with acidic reaction and low organic carbon etc. The usage of this method, besides its usual role in imparting degradable organic matter stimulates biolic activities and improves physical properties of the soil.

The following examples are given by way of illustration of the present invention and should not be construed to limit the scope of the present invention.

EXAMPLE 1

Aliquots of one kg of dry alkaline soil (pH 9.4) obtained from Banthra Farm (Lucknow, India) were mixed with 25 g ($E_1$), 50 g ($E_2$) and 75 g ($E_3$) of chopped fresh foliage of scented geranium and put in ceramic pots separately. Each pot was intermittently (weekly) moistened with double distilled water during the standing period of one month. After one month the treated soil from each pot was allowed to dry, powdered and 10 g soil samples were collected from each pot and processed for pH testing. Simultaneously, the soil was also processed identically as above except that no foliage was added to it to serve as control. For pH measurement, each soil sample including control was suspended in two volumes (i.e. 25 ml) of double distilled water and the suspension was stirred for 30 minutes on a magnetic stirrer. The suspension was checked for pH status using a calibrated pH meter. After recording pH of the soil-water suspension, the samples were allowed to stand for 15 minutes and the supernatants were decanted and checked for their pH. The results are tabulated below:

| Sample description | pH of Soil:Water suspension | Decanted supernatant |
| --- | --- | --- |
| Control | 9.4 | 9.1 |
| $E_1$ | 9.1 | 8.9 |
| $E_2$ | 9.0 | 8.7 |
| $E_3$ | 8.8 | 8.5 |

A dose-dependent fall in the alkalinity of the soil is evident even in a single application of the scented geranium foliage.

EXAMPLE 2

Aliquots of one kg of dry alkaline soil (pH 9.4) obtained from Banthra Farm (Lucknow, India) were mixed with 10 g ($E_1$), 20 g ($E_2$) and 40 g ($E_3$) of dried distillation-residual aerial biomass of scented geranium and put in ceramic pots separately. Each pot was watered in the beginning and then moistened intermittently (weekly) with double distilled water during the standing period of one month. After one month, the treated soil from each pot was allowed to dry, powdered and 10 g soil samples were collected from each pot and processed for pH testing. Simultaneously, the soil was also processed identically as above except that no foliage was added to it to serve as control. For pH measurement, each soil sample including control was suspended in two volumes (i.e. 25 ml) of double distilled water and the suspension was stirred for 30 minutes on a magnetic stirrer. The suspension was checked for pH status using a calibrated pH meter. After recording pH of the soil-water suspension, the samples were allowed to stand for 15 minutes and the supernatants were decanted and checked for their pH. The results are tabulated below:

| Sample description | pH of Soil:Water suspension | Decanted supernatant |
| --- | --- | --- |
| Control | 9.4 | 9.1 |
| $E_1$ | 9.3 | 8.9 |
| $E_2$ | 9.2 | 8.7 |
| $E_3$ | 9.1 | 8.6 |

A dose-dependent fall in the alkalinity of the soil is evident even in a single application of the distillation-residual aerial biomass of scented geranium.

EXAMPLE 3

Aliquots of 750 g of dry alkaline soil pH 9.4) obtained from Banthra Farm (Lucknow, India) were mixed with 25 g ($E_1$) and 50 g ($E_2$) of dried distillation-residual aerial biomass of scented geranium and put in ceramic pots separately. Each pot was watered in the beginning and then moistened intermittently (weekly) with double distilled water during the standing period of one month. After one month the treated soil from each pot was allowed to dry, powdered and 10 g soil samples were collected from each pot and processed for pH testing. Simultaneously, the soil was also processed identically as above except that no biomass was added to it to serve as control. For pH measurement, each soil sample including control was suspended in two volumes (i.e. 25 ml) of double distilled water and the suspension was stirred for 30 minutes on a magnetic stirrer. The suspension was checked for pH status using a calibrated pH meter. After recording pH of the soil-water suspension, the samples were allowed to stand for 15 minutes and the supernatants were decanted and checked for their pH The results are tabulated below:

| Sample description | pH of | |
| --- | --- | --- |
| | Soil:Water suspension | Decanted supernatant |
| Control | 9.4 | 9.1 |
| $E_1$ | 8.9 | 8.7 |
| $E_2$ | 8.3 | 8.1 |

A dose-dependent fall in the alkalinity of the soil is evident even in a single application of the distillation-residual aerial biomass of scented geranium.

EXAMPLE 4

Aliquots of 750 g of dry alkaline soil (pH 9.4) obtained from Banthra Farm (Lucknow, India) was made moist with double distilled water in a ceramic pot. The pot soil was treated with 100 ml of the distillation-residual water from still of the distillation unit of Scented geranium After one month, the treated soil from each pot was dry-powdered and 10 g soil samples were collected from each pot and processed for pH testing. Simultaneously, the soil was also processed identically as above except that 100 ml of distilled water was added to it instead of the distillation-residual water to serve as a control. For pH measurement, each soil sample including control was suspended in two volumes (i.e. 25 ml) of double distilled water and the suspension was stirred for 30 minutes on a magnetic stirrer. The suspension was checked for pH status using a calibrated pH meter. After pH of the soil-water suspension was noted, the samples were allowed to stand for 15 minutes and the supernatants were decanted and checked for their pH. The results are tabulated below:

| Sample description | pH of | |
| --- | --- | --- |
| | Soil:Water suspension | Decanted supernatant |
| Control | 9.4 | 9.1 |
| Treatment | 9.0 | 8.3 |

Evidently, the alkalinity of the soil diminished with application of the scented geranium distillation-residual water. The Main Advantages of the Present Invention are:

1. It provides phyto-remediation approach of reclaiming soil alkalinity which is on an increasing trend both in acreage and magnitude world-wide and is a key factor causing fall in crop productivity.
2. It also provides a mechanism of recycling of soil nutrients and increases soil organic matter.
3. It is an effective way of utilizing the source material, particularly the distillation-residual aerial biomass, for soil maintenance and improvement of soil properties.
4. The practice is simple and eco-friendly for restoring alkalinity-degraded soils.
5. The phyto-remediation approach is socio-economically acceptable as a part of package of practices for crop husbandry both at cottage and commercial scales.
6. It can be adopted as a co-activity in certain mining operations to avoid mining-associated alkalization of soils.
7. It offers best use of the utilized herbage (valuable oil extracted) and of distillation-residual water which are considered wastes and discarded.
8. It can be employed as a co-activity to check the progression of soil alkalinity due to fuel gas desulfurization by-product (FGD) of coal-powdered electrical plants.

What is claimed is:

1. An ecological method of phyto-remediation of alkaline and chemically degraded soils using scented geranium, Pelargonium species, which comprises the steps of treatment of the alkaline soil by dispersing or mixing an effective amount of fresh aerial geranium biomass or distillation-residual aerial geranium biomass obtained from essential oil distillation unit, or percolation of the distillation-residual water from scented geranium distillation unit.

2. A method of phyto-remediation of alkaline and chemically degraded soils, said method comprising the step of:
   (a) dispersing geranium biomass in alkaline or chemically degraded soil in the ratio of 1:0.01 to 0.075, or
   (b) applying distillation residual water to the alkaline or chemically degraded soil of step (a) in the ratio of 6:1–8:1.

3. A method as claimed in claim 2 wherein fresh aerial biomass obtained after distillation of essential oil from the plant is used.

4. A method as claimed in claim 2 wherein dry aerial biomass obtained after distillation of essential oil from the plant is used.

5. A method as claimed in claim 2 wherein geranium biomass is mixed or dispersed with the alkaline or chemically degraded soil.

6. A method as claimed in claim 2 wherein the pH of the soil is >8.5.

7. A method as claimed in claim 2 wherein the residual water obtained after distillation of essential oil from the biomass is percolated in the alkaline or chemically degraded soil.

8. A method as claimed in claim 2 wherein the treatment with Pelargonium biomass is continued for 4 weeks.

9. A method as claimed in claim 2 wherein the ratio of soil to dry distillation residual aerial biomass is 1:0.03 to 0.06.

10. A method as claimed in claim 2 wherein fresh or distillation-residual aerial biomass of scented geranium, Pelargonium sp., is used for phyto-remediation of alkaline and chemically degraded soils.

11. A method as claimed in claim 2 wherein distillation-residual water of scented geranium is used for the reclamation of alkaline soils.

12. A method as claimed in claim 2 wherein the distillation residual water is applied to the alkaline or chemically degraded soil of step (a) in the ratio of 7.5:1.

* * * * *